United States Patent [19]

Allen

[11] Patent Number: 4,542,389

[45] Date of Patent: Sep. 17, 1985

[54] SELF CLEANING INK JET DROP GENERATOR HAVING CROSSTALK REDUCTION FEATURES

[75] Inventor: Ross R. Allen, Ramona, Calif.

[73] Assignee: Hewlett-Packard Company, Palo Alto, Calif.

[21] Appl. No.: 444,108

[22] Filed: Nov. 24, 1985

[51] Int. Cl.[4] .............................................. G01D 15/18

[52] U.S. Cl. ................................................ 346/140 R

[58] Field of Search ................................ 346/140, 75

[56] References Cited

U.S. PATENT DOCUMENTS 3,747,120 7/1973 Stemme .......................... 346/140 X
4,126,868 11/1978 Kirner ................................ 346/140
4,317,124 2/1982 Shirato ............................... 346/140

*Primary Examiner*—Joseph W. Hartary
*Attorney, Agent, or Firm*—John A. Frazzini

[57] ABSTRACT

An ink jet drop generator is presented which has a nozzle plate containing at least one nozzle for controlled ejection of droplets of ink. The ejection of ink can be produced by a number of means including by production of a gas bubble in the ink in the vicinity of the nozzle. The nozzle plate also contains at least one drain hole to remove drops of ink from the outer surface of the nozzle plate. These drain holes are preferably connected to an accumulator having a pressure below ambient pressure to help draw drops of ink from the outer surface. The nozzle plate also contains isolator holes which are connected to a refill plenum to help dissipate disturbance energy in the ink to reduce fluidic crosstalk between emitters in multi-emitter heads.

4 Claims, 2 Drawing Figures

SELF CLEANING INK JET DROP GENERATOR HAVING CROSSTALK REDUCTION FEATURES

BACKGROUND OF THE INVENTION

This invention relates in general to ink jet drop generators and more particularly to an ink jet drop generator which continuously removes ink drops from its outer surface and which has features reducing fluidic crosstalk between emitters. There are a variety of ink jet printers and plotters which produce drops by different means including continuous-jet emitters, in which droplets are generated continuously at a constant rate under constant ink pressure, electrostatic emitters, and drop-on-demand emitters (or impulse jets). These emitters include means for producing a droplet, a nozzle to form the droplet, means for replacing the ejected ink and a power source to energize ejection of the droplet. The nozzles are used to control the shape, volume, and/or velocity of ejected droplets. Such devices employ either a single nozzle or a plurality of nozzles arranged in a linear or a planar pattern. All of these ink jet devices are subject to problems caused by wetting and contamination of the nozzles by ink and its residues on the outer surface of the nozzle.

Wetting of the outer surface of the ink jet nozzle can be caused by a variety of sources such as by droplets dislodged from the nozzles by shock or vibration. Ink spray produced during drop ejection can also deposit ink on the nozzle. Similarly, excess pressure in the ink in the ink reservoir or refill channels either during shipping, during operation or during the priming step in which air is bled from the channels connecting the emitters to the ink reservoir can force ink out of the nozzles onto the outer surfaces of the nozzles. Various types of malfunctions such as gas bubbles trapped in the nozzle can also cause ink to be deposited on the outer surface. The result of wetting the nozzle outer surface is usually a combination of fluid drops and dried ink residues which can prevent emission of ink droplets or disturb their trajectory and stability. In order to achieve high quality printing and/or plotting from an ink jet device, it is important that the nozzles remain free of obstructions and contamination and that the meniscus of the ink in each nozzle be predictable in its extent, orientation and location. For proper operation, surface fluid and residues must be prevented from accumulating on or near the nozzles.

Some previous solutions of the wetting problem have involved non-wetting surfaces and associated hardware and plumbing to remove and dispose of accumulated surface fluid. In these solutions, a non-wetting ink jet nozzle surface is utilized so that ink drops tend to bead up on the surface rather than adhering to and spreading out over the surface. When an ink drop reaches a critical size, its weight overcomes the attraction it has to the surface so that it either falls off of the surface or runs off of the surface without leaving a significant trail of ink. An external gutter typically collects such drops either for clean disposal or for return to the ink reservoir after being filtered to remove impurities. Such non-wetting surfaces limit the accumulation of ink on the outer surface of the ink jet nozzle but do not solve the problem of removal and disposal of ink and its residue from the outer surface.

In other previous solutions, various mechanical methods are used to clean the outer surface. Some of these methods include directing jets of air at the surface to blow away drops, wiping the surface or rolling an absorbant roller across the surface. This mechanical cleaning requires additional mechanisms, is inherently intermittent, introduces idle time for the ink jet device, and the wiper or roller can itself become a source of contamination. In particular, the intermittent nature of cleaning the nozzle surface may allow excessive surface fluid to accumulate, interfering with operation and allowing residues to form.

Another problem to which multiple emitter ink jets are susceptible is fluidic crosstalk between emitters. Linear and planar arrays of emitters often are connected by short refill channels to a common fluid-filled cavity, referred to as a plenum, which is in close proximity to the emitters and from which ink is drawn to refill the ink jet emitters after a droplet or droplets of ink are ejected. When ink is ejected from one emitter, a pressure disturbance is produced in the plenum which can disturb the ink in other nearby emitters. In addition, after ink has been ejected from an emitter, the flow of ink within the plenum to refill that emitter may disturb the ink in other nearby emitters.

In order to achieve high quality printing and plotting with ink jets, it is important that the ink within an emitter be substantially quiescent just before ink is ejected from that emitter. The ink forms a meniscus at the outer opening of each of the nozzles. These menisci can be caused to oscillate as a result of pressure waves and fluid flow in the vicinity of the emitter. If an emitter is caused to eject a droplet while its meniscus is oscillating, the size of the resulting droplet and its trajectory are essentially uncontrolled and can vary depending on the phase of this oscillation at the time of ejection. In severe cases, such disturbances can cause unwanted droplets to be emitted from one or more adjacent emitters. Therefore, it is important to reduce the disturbance of ink in an emitter caused by the ejection of ink from other emitters. In addition, oscillations of the meniscus in an emitter during its refill cycle should be well-damped such that a secondary droplet is not emitted and the fluid in the nozzle is quiescent for the next ejection cycle.

SUMMARY OF THE INVENTION

In accordance with the illustrated preferred embodiment, an ink jet nozzle plate is presented which includes a mechanism for continuously removing drops of ink from the outer surface of the ink jet nozzle plate. The ink jet nozzle plate includes at least one ink jet nozzle hole and a plurality of drain holes. These drain holes are connected to a common reservoir which is preferrably maintained below the ambient pressure to facilitate drawing drops on the outer surface of the ink jet nozzle plate into one or more of the drain holes. In a particularly simple embodiment, the drain holes and nozzles are connected to a common plenum which is maintained below the ambient pressure.

In ink jet devices having more than one emitter, the emitters may be connected to a common plenum from which each can withdraw ink to refill after ejecting a droplet of ink. A barrier is included in the plenum to prevent direct flow of fluid or direct transmission of pressure changes from one emitter to another emitter. The barrier includes a plurality of short refill channels within each of which is an emitter and near each opening (mouth) or openings of each channel to the plenum is one or more drains. The refill channels connect the emitters to the plenum to enable them to refill with ink. A drain near the mouth of one of these channels is referred to as an isolator drain because it not only functions to remove ink drops from the surface of the ink jet nozzle, but also assists in fluidically isolating the operation of one emitter from the operation of another emitter. These isolators absorb a significant amount of the energy in a disturbance produced in the ink in the plenum as a result of the ejection of a droplet from an emitter. This reduces the amount of disturbance to the ink in emitters near to that isolator and thereby reduces the amount of fluidic crosstalk between emitters. The locations and sizes of the holes are selected to avoid ejecting droplets of ink from the drain holes as a result of the ejection of ink droplets from one or more emitters.

DESCRIPTION OF THE PREFERRED EMBODIMENT

Figure 1:
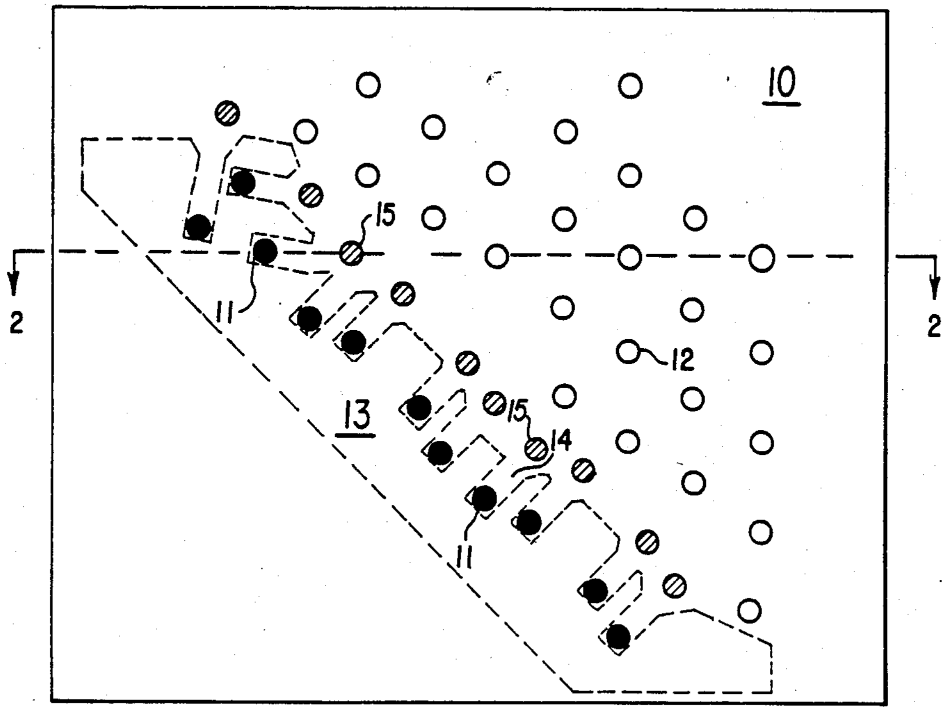
FIG. 1 illustrates the drain holes and isolators in the nozzle plate of an ink jet drop generator constructed in accordance with the disclosed invention.

In FIG. 1 is shown a portion of a nozzle plate 10 in an ink jet nozzle which is configured to actively remove drops of ink from its outer surface. Nozzle plate 10 is perforated by a number of ink jet nozzles 11 represented in FIG. 1 as solid black circles. In operation of the ink jet device, a piece of paper or other recording medium 26 is placed a suitable distance from nozzle plate 10 and droplets 27 of ink are controllably ejected from nozzles 11 to print and/or plot on the paper. Nozzle plate 10 is on the order of 0.25 inch by 0.25 inch by 0.004 inch in thickness and nozzles 11 are on the order of 0.0032–0.0035 inches in diameter with a spacing between adjacent nozzles on the order of 0.015 inches.

Figure 2:
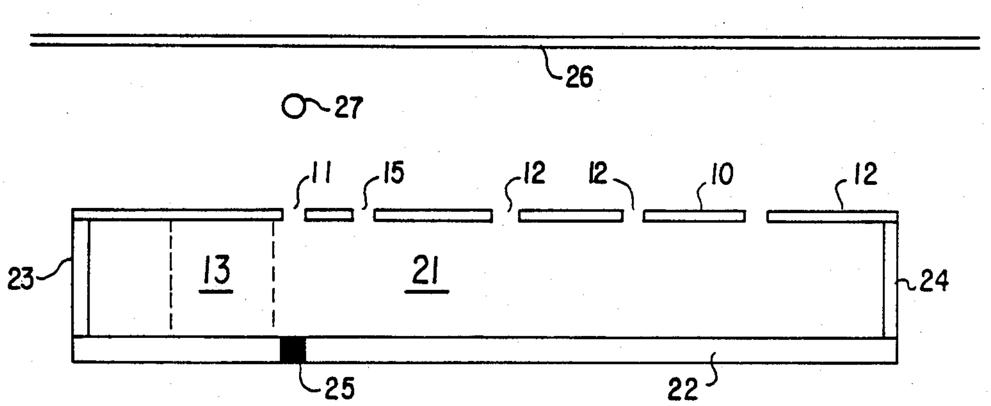
FIG. 2 is a cross-section of the ink jet drop generator shown in FIG. 1, illustrating the plenum and refill channels.

As shown in FIG. 2, nozzles 11 are connected to a common cavity 21, referred to as the plenum, which serves as a local ink reservoir to supply the emitters with ink. Plenum 21 is enclosed by nozzle plate 10, by a back plate 22 spaced about 0.0015–0.004 inches from the nozzle plate and by side walls such as walls 23 and 24 shown in FIG. 2. Plenum 21 is also connected to a remote reservoir (not shown) from which ink is supplied to the plenum. In general, ink can be ejected through nozzles 11 by a variety of means including constant pressure, pressure pulses and electrostatic ejection. In the embodiment shown in FIG. 2, ink is ejected through a selected nozzle 11 by producing a gas bubble in the region of the plenum adjacent to the selected nozzle. Each nozzle 11 has an associated heat source such as resistor 25 to controllably produce bubbles of ink vapor in the region of the plenum adjacent to that emitter to controllably eject ink droplets from it.

As shown in FIG. 1, nozzle plate 10 is also perforated by a number of drain holes 12 shown in FIG. 1 as open circles. Drain holes 12 are connected to a common accumulator which is preferrably maintained below ambient pressure so that any drops coming in contact with a drain hole are drawn into this accumulator and thereby removed from the outer surface of the nozzle plate. Actually, because of surface tension, drops of ink have an internal pressure somewhat above ambient pressure so that this common accumulator need only be at a pressure below the internal pressure of typical ink drops on the surface. The internal pressure of a drop varies with size and therefore, to be able to draw in drops of any size, it is preferred to maintain a pressure in this reservoir slightly below ambient pressure. In general, plenum 21 is maintained slightly (on the order of 0–3 inches of water) below ambient pressure to prevent ink from flowing freely from nozzles 11 when the ink jet drop generator is subjected to shock or vibration. Therefore, in the preferred embodiment, the drain holes are also connected to plenum 21, thereby eliminating the need for a separate drain accumulator. The ink in the plenum can be maintained below ambient pressure by a number of means including locating the top of the remote reservoir below the plenum, or by placing foam, fiber bundles, glass beads or other materials in the remote reservoir to produce a negative gage pressure through capillary action.

Drain holes 12 need only remove ink drops from the vicinity of nozzles 11 and therefore need not be located throughout nozzle plate 10. The drain holes are therefore generally only spaced throughout a region in which wetting is expected from the nozzles and spray. The drain holes typically have diameters on the order of the diameter of the nozzles (i.e., on the order of 0.003 inches) and are spaced apart by a distance on the order of 3–5 diameters.

In the particular embodiment shown in FIGS. 1 and 2, the ink jet device contains a barrier 13 located in the plenum to prevent direct flow of ink or direct transmission of pressure between emitters. This barrier is substantially perpendicular to nozzle plate 10 and backplate 22 forming a seal between them. Barrier 13 extends between adjacent emitters and forms refill channels such that each emitter is located in an associated refill channel 14. When a droplet is ejected by an emitter through a nozzle 11, ink flows from the plenum through that emitter's associated refill channel to replace the ejected ink. The refill channels serve to isolate the other emitters from the disturbance due to this flow of ink and the pressure waves caused by the vapor bubble. The drains and nozzles cannot be too closely spaced or else they will weaken the nozzle plate and enable it to flex under the pressures produced by drop generation. If the barrier is allowed to flex, then it will flex away from barrier 13 and break the seal between plates 10 and 23 allowing direct fluidic communication between adjacent emitters. Such communication will result in disturbance of the menisci located at the outer openings of nearby nozzles, thereby affecting the ejection of droplets from those emitters until this disturbance dies away. Such disturbances are referred to as fluidic crosstalk between emitters.

Although barrier 13 significantly reduces fluidic crosstalk between emitters, disturbance of the ink in one channel will transmit energy into nearby channels since the plenum has a finite fluidic impedance. Since high quality printing and plotting requires the meniscus in a nozzle 11 to be nearly quiescent just before ejection of a droplet from that nozzle, it is advantageous to absorb disturbance energy before it can travel to nearby emitters. The dynamics of fluid in the drain holes provides a mechanism for absorbing much of the disturbance energy.

The manner in which the drain holes serve to dissipate disturbance energy can be seen as follows. In each of drain holes 12, the ink forms a meniscus which, due to surface tension, stores energy and can be made to oscillate by pressure disturbances in the nearby fluid. The fluid dynamics of the ink in an emitter has a simple electrical analog: the menisci are analogous to capacitors, the masses of the oscillating ink in the refill channels, nozzles and drains are analogous to inductors, and the viscosity of the ink is analogous to electrical resistance. Therefore, the collection of nozzles and drains is analogous to a distributed set of capacitors connected together by a distributed inductance and resistance. The drains and emitters will therefore have a set of fundamental modes of damped oscillation which can help dissipate disturbance energy.

The coupling of the drains to the emitters is enhanced by placing a drain at the mouth of each of the channels 14 to help absorb disturbance energy travelling out of or into its associated channel. The meniscus in this drain will have the largest response to the disturbance caused by ejection of a droplet from its associated emitter. These drain holes are therefore referred to as isolators because they not only serve as drain holes but in addition help to further isolate emitters from disturbances in the fluid caused by other emitters. These isolators 15 are represented in FIG. 1 by the cross-hatched circles. To avoid ejecting a droplet from its associated isolator when a droplet is ejected from a selected emitter, each isolator is spaced about 0.01–0.015 inches from its associated emitter. It should be noted that even in nozzle plates which either do not make use of drain holes 12 or which have these holes connected to an accumulator distinct from plenum 21, isolators 15 can be included which do connect to the refill plenum to help dissipate disturbance energy.

The fundamental modes of oscillation of the menisci have a set of resonant frequencies and therefore some consideration must be given to assuring that none of these frequencies are near any operating frequency of the system. One frequency of the system arises from the action of a gas bubble expanding and then contracting. During the expansion, the bubble exerts a positive gage pressure on the surrounding fluid, and when it contracts, it creates a negative gage pressure on the surrounding fluid. Fourier decomposition of the bubble pressure behavior includes multiples of the fundamental frequency of this process. Thermal energy stored in the fluid during initial bubble collapse can cause incomplete collapse and rebounding of the bubble. In addition, initial collapse of the vapor bubble brings fluid in contact with resistor 25 in thermal ink jets. In some cases, reboiling may occur at the surface of resistor 25 producing a secondary bubble. The expansion and contraction occur within about 25 microseconds so that the frequencies involved here are multiples of a primary frequency of about 40 kilohertz which is about an order of magnitude higher than expected resonance frequencies.

Another frequency of the system arises if the ejection of ink from the emitters occurs at equally spaced intervals. Because all of the emitters, drains and isolators interact to determine the resonance frequencies, a given mode of vibration will receive energy from more than one emitter. Therefore, care must be taken that disturbance energy from one or more emitters and from one or more cycles of ejecting droplets does not accumulate sufficiently in a mode to adversely affect the ejection of droplets from the emitters. In general, because of their fluidic coupling, the emitters and isolators will be much more affected by the disturbance energy than the drains which are more remote from the emitters.

The response to disturbance energy can be controlled by selection of several parameters including the cross-sectional area of the refill channels, the length of the channels, and the area of the isolator holes. To a lesser degree, the size and spacing of the drain holes 12 will also affect the response of the fundamental modes of oscillation. An increase in any of these parameters increases the amount of mass of ink taking part in an oscillatory mode thereby increasing the inertance and affecting viscous damping involved in the motion. Also, an increase in the diameter of an isolator hole reduces the curvature of its meniscus for a given volumetric displacement thereby reducing the effective stiffness of the meniscus. This is analogous to increasing the capacitance of its electrical analog. These parameters can thus be chosen to design and optimize the response of particular isolators. The particular choice of parameters will depend on the pattern of the nozzles, the shape of barrier 13 and typical time sequences of ejection of droplets from various emitters, either singularly or in combination. The choices of parameters are limited by the constraint that ink should not be inadvertently ejected from any emitter under the worst case conditions of operation, shock and vibration, but otherwise can be selected to minimize the amount of fluidic crosstalk between channels.

I claim:

1. A drop generator comprising:

a hollow container having a nozzle plate and a back plate, said container enclosing a plenum in which is contained a liquid that is in contact with the nozzle plate and the back plate;

said nozzle plate having at least two nozzles;

each of said nozzles having associated with it a means for ejecting droplets of liquid through its associated nozzle;

a barrier located in the plenum, said barrier extending substantially from the nozzle plate to the back plate and having at least one refill channel that opens into the plenum at a mouth;

each refill channel having associated with it a nozzle and means for ejecting droplets of liquid through that nozzle;

each refill channel having located within it the volume of liquid located directly between its associated nozzle and its associated means for ejecting droplets; and in each portion of the nozzle plate adjacent to the mouth of each refill channel, an isolator hole in which the ink forms a meniscus, whereby the meniscus in an isolator hole will oscillate in response to disturbances in the ink associated with ejection of droplets through the nozzle associated with that channel, thereby dissipating some of the energy of such disturbance before such disturbances can be transmitted to another nozzle.

2. An ink jet drop generator as in claim 1 wherein the size of each isolator and the distances of each isolator from adjacent emitters are selected to avoid ejecting droplets of ink from the isolators.

3. An ink jet drop generator as in claim 2 wherein the size of each isolator and the distances of each isolator from adjacent emitters are also selected to minimize the amount of fluidic crosstalk between emitters.

4. An ink jet drop generator as in claim 1 further comprising at least one drain hole in the nozzle plate, each drain hole connected to the ink reservoir and having a meniscus of ink.

* * * * *

UNITED STATES PATENT AND TRADEMARK OFFICE
CERTIFICATE OF CORRECTION

PATENT NO. : 4,542,389

DATED : Sep. 17, 1985

INVENTOR(S) : Allen

It is certified that error appears in the above-identified patent and that said Letters Patent is hereby corrected as shown below:

Cover Page, Item [22] Filed:

"Nov. 24, 1985" should read -- Nov. 24, 1982 --

Signed and Sealed this

*Fifteenth* Day of *April 1986*

[SEAL]

*Attest:*

DONALD J. QUIGG

*Attesting Officer* *Commissioner of Patents and Trademarks*